United States Patent [19]

Fujinaka et al.

[11] Patent Number: 5,127,666
[45] Date of Patent: Jul. 7, 1992

[54] VEHICLE REAR SUSPENSION MOUNTING STRUCTURE

[75] Inventors: Mitsuru Fujinaka, Higashihiroshima; Nobuhiro Komatsu, Yokohama; Motoharu Sato, Hiroshima; Toshiro Kondo, Hatsukaichi; Eiichiro Iida, Hiroshima, all of Japan

[73] Assignee: Mazda Motor Corporation, Hiroshima, Japan

[21] Appl. No.: 553,324

[22] Filed: Jul. 17, 1990

[30] Foreign Application Priority Data

Jul. 20, 1989 [JP] Japan .................. 1-188643
Jun. 22, 1990 [JP] Japan .................. 2-165148

[51] Int. Cl.⁵ .............................................. B60G 11/00
[52] U.S. Cl. ...................................... 280/688; 296/198
[58] Field of Search ............... 280/688, 725, 726, 716; 296/195, 198

[56] References Cited

U.S. PATENT DOCUMENTS

| | | | |
|---|---|---|---|
| 3,231,040 | 1/1966 | Blanchette | 280/688 |
| 4,453,738 | 6/1984 | Murata et al. | 280/725 |
| 4,714,132 | 12/1987 | Hattori et al. | 280/716 |
| 4,762,336 | 8/1988 | Ogawa et al. | 280/673 |
| 5,024,482 | 6/1991 | Harasaki et al. | 280/688 |

FOREIGN PATENT DOCUMENTS

| | | |
|---|---|---|
| 071250 | 2/1983 | European Pat. Off. |
| 193847 | 9/1986 | European Pat. Off. |
| 316285 | 5/1989 | European Pat. Off. |
| 1013534 | 4/1967 | Fed. Rep. of Germany |
| 2144383 | 3/1972 | Fed. Rep. of Germany |
| 0205207 | 12/1982 | Japan .................. 280/725 |
| 0063577 | 4/1983 | Japan .................. 296/198 |
| 0289476 | 12/1987 | Japan .................. 296/195 |
| 0162312 | 7/1988 | Japan .................. 280/663 |

OTHER PUBLICATIONS

European Search Report completed on Oct. 31, 1990 in Berlin by Examiner P. O. Krieger, citing 7 references attached hereto.
English Abstract of Japanese Patent Publication No. 58-20504–one page.
English Abstract of Japanese Patent Publication No. 63-162312–one page.

Primary Examiner—Charles A. Marmor
Assistant Examiner—Paul Dickson

[57] ABSTRACT

A vehicle rear suspension mounting structure for mounting, to a vehicle body, the other end of a rear suspension. The rear suspension includes a suspension link, one end of which is coupled to a wheel support member for rotatably supporting a vehicle wheel and which extends substantially in a longitudinal direction of the vehicle body. The mounting structure has a vehicle body coupling end formed on the other end of the suspension link, a link bracket for supporting the vehicle body coupling end, and a joint member for joining the link bracket to a rear quarter panel constituting a rear wheel house portion.

21 Claims, 11 Drawing Sheets

VEHICLE REAR SUSPENSION MOUNTING STRUCTURE

BACKGROUND OF THE INVENTION

The present invention relates to a rear suspension mounting structure for mounting a rear suspension comprising a suspension link extending substantially in a longitudinal direction of a vehicle body to the vehicle body and, more particularly, to a mounting structure of a vehicle body coupling end of the suspension link.

As a rear suspension for a vehicle, these is know a so-called multi-link type rear suspension comprising a plurality of suspension links, one-end portions of which are coupled to a vehicle body, and the other-end portions of which are coupled to a vehicle wheel support member for rotatably supporting a vehicle such a structure is. as disclosed in, e.g., Japanese Utility Model Laid-Open No. 62-117104.

In the multi-link type rear suspension, its suspension links can be variously combined and arranged. For example there has been proposed, a multi-link rear suspension comprising a suspension upper link which is located above some other suspension links, and which extends substantially in a longitudinal direction of a vehicle body.

Since the suspension upper link is located at a relatively upper position, and extends substantially in the longitudinal direction of the vehicle body, its vehicle body coupling end is coupled to the vehicle body on a rear wheel house portion, especially, on a portion near a rear wheel house panel constituting the rear wheel house portion.

A suspension link is preferably coupled to a vehicle body with a sufficient support rigidity to prevent noise or a vibration based on a load input to the vehicle body through the suspension link or to prevent the suspension link from projecting into a passenger's room upon collision.

Therefore, when the rear suspension comprises a suspension link whose vehicle body coupling end is located near the rear wheel house panel and which extends in the longitudinal direction of the vehicle body, the vehicle body coupling end of this suspension link should be coupled to the vehicle body to obtain a sufficient support rigidity.

SUMMARY OF THE INVENTION

The present invention has been made in consideration of the above situation, and has as its object to provide a vehicle rear suspension mounting structure in which a vehicle body coupling end of a suspension link extending substantially in a longitudinal direction of a vehicle body is coupled to the vehicle body near a rear wheel house panel to obtain a sufficient support rigidity.

In order to achieve the above object, according to the present invention, there is provided a vehicle rear suspension mounting structure for mounting, to a vehicle body, the other end of a rear suspension including a suspension link, one end of which is coupled to a wheel support member for rotatably supporting a vehicle wheel and which extends substantially in a longitudinal direction of the vehicle body. The mounting structure comprises: a vehicle body coupling end formed on the other end of the suspension link; a link bracket for supporting the vehicle body coupling end; and joint means for joining the link bracket to a rear quarter panel constituting a rear wheel house portion.

In the rear suspension mounting structure of a first aspect of the present invention, the vehicle body coupling end is rotatably supported o the link bracket via a rubber bushing.

In the rear suspension mounting structure of a second aspect of the present invention, the rubber bushing is stored in a sleeve fixed to the vehicle body coupling end.

In the rear suspension mounting structure of a third aspect of the present invention, the rear wheel house portion further comprises a rear wheel house inner portion which is joined to the rear quarter panel at an inner end thereof in a widthwise direction of the vehicle body.

In the rear suspension mounting structure of a fourth aspect of the present invention, one end of the link bracket is joined to the rear quarter panel, and the other end thereof is joined to the rear wheel house inner portion.

In the rear suspension mounting structure of a fifth aspect of the present invention, the link bracket is joined to the rear quarter panel and the rear wheel house inner portion through a bolt and a nut.

In the rear suspension mounting structure of a sixth aspect of the present invention, the suspension link extends from a rear portion of the vehicle body toward a front portion thereof, and is inclined outwardly in a lateral direction of the vehicle body toward the front portion.

In the rear suspension mounting structure of a seventh aspect of the present invention, the rear wheel house inner portion comprises a bulged portion which is bulged upward in a rectangular shape on a joint portion to the rear quarter panel, and a lower surface of which defines a recess portion with an open lower surface, and the link bracket is fitted in the recess portion from below, and is joined to be commonly fastened together with the rear wheel house inner portion and the rear quarter panel via a bolt.

The rear suspension mounting structure of an eighth aspect of the present invention, further comprises: a rear fender, joined to an outer portion of the rear quarter panel, for forming a closed space between itself and the rear quarter panel; and a belt reinforcement for reinforcing the closed space, and a lower end of the belt reinforcement extends to a portion of the rear quarter panel where the link bracket is joined, and is fixed to the portion of the rear quarter panel.

In the rear suspension mounting structure of a ninth aspect of the present invention, the lower end of the belt reinforcement is commonly fastened to the link bracket via the bolt.

In the rear suspension mounting structure of a tenth aspect of the present invention, the link bracket is welded to a lower surface of the rear quarter panel.

The rear suspension mounting structure of an eleventh aspect of the present invention, further comprises: a link reinforcement for coupling the belt reinforcement and an upper surface of a portion of the rear quarter panel where the link bracket is joined, and reinforcing a mechanical strength of the rear quarter panel of the portion where the link bracket is joined.

In the rear suspension mounting structure of a twelfth aspect of the present invention, the link bracket is welded to extend over lower surfaces of the rear quarter panel and the rear wheel house inner portion.

In the rear suspension mounting structure of a thirteenth aspect of the present invention, a portion to be welded of the link bracket is formed into an inverted-V shape having a pair of inclined surfaces which cross each other, a portion of the rear wheel house inner portion where the link bracket is welded comprises a first inclined surface opposing one inclined surface of the inverted-V shaped portion, and a portion of the rear quarter panel where the link bracket is welded comprises a second inclined surface opposing the other inclined surface of the inverted-V shaped portion.

In the rear suspension mounting structure of a fourteenth aspect of the present invention, the link bracket comprises a main body having an upper surface welded to a lower surface of the rear wheel house inner portion, and an upright segment integrally formed on one side of the main body, and clamped between joint portions of the rear wheel house inner portion and the rear quarter panel to be welded thereto.

The rear suspension mounting structure of a fifteenth aspect of the present invention, further comprises: a mount stay which is attached to the vehicle body coupling end and two ends of which project outwardly, and the link bracket has, on an upper surface thereof, a pair of recess portions which are juxtaposed in a widthwise direction of the vehicle body, and the vehicle body coupling end is supported on the lower surfaces of the pair of recess portions of the link bracket via the mount stay.

In the rear suspension mounting structure of a sixteenth aspect of the present invention, two ends of the mount stay are supported on the lower surfaces of the pair of recess portions of the link bracket via bolts and nuts, the nuts are welded to bottom surfaces of the corresponding recess portions, and the bolts are threadably engaged with the corresponding nuts via through holes formed on the bottom surfaces of the corresponding recess portions.

In the rear suspension mounting structure with the above arrangement, the rear wheel house portion of a vehicle is constituted by the rear wheel house panel consisting of a rear wheel house inner portion and a rear quarter panel. The rear quarter panel has a relatively high rigidity since its thickness is increased because a sheet belt retractor is normally attached thereto. The rear quarter panel forms a closed section together with a rear fender. In addition, a belt reinforcement is disposed in the closed section formed by the rear quarter panel and the rear fender. For these reasons, the rear quarter panel has a high mechanical strength and rigidity. In the vehicle rear suspension mounting structure, since a link bracket for supporting a vehicle body coupling end of the suspension link is joined to the rear quarter panel having the high mechanical strength and rigidity, the suspension link is coupled to the rear quarter panel (rear wheel house panel).

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Various embodiments of a rear suspension mounting structure according to the present invention will be described below with reference to the accompanying drawings.

Figure 1:
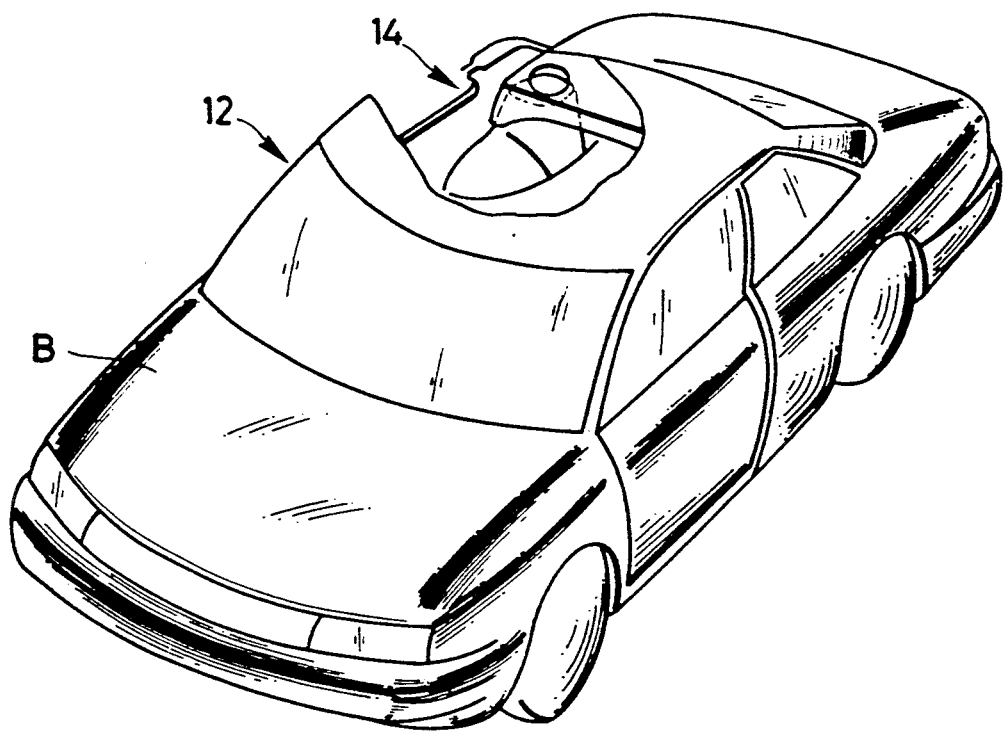
FIGS. 1 and 2 are a partially cutaway perspective view and a perspective view respectively showing a vehicle and a rear suspension to which an embodiment of the present invention is to be applied.
Figure 2:
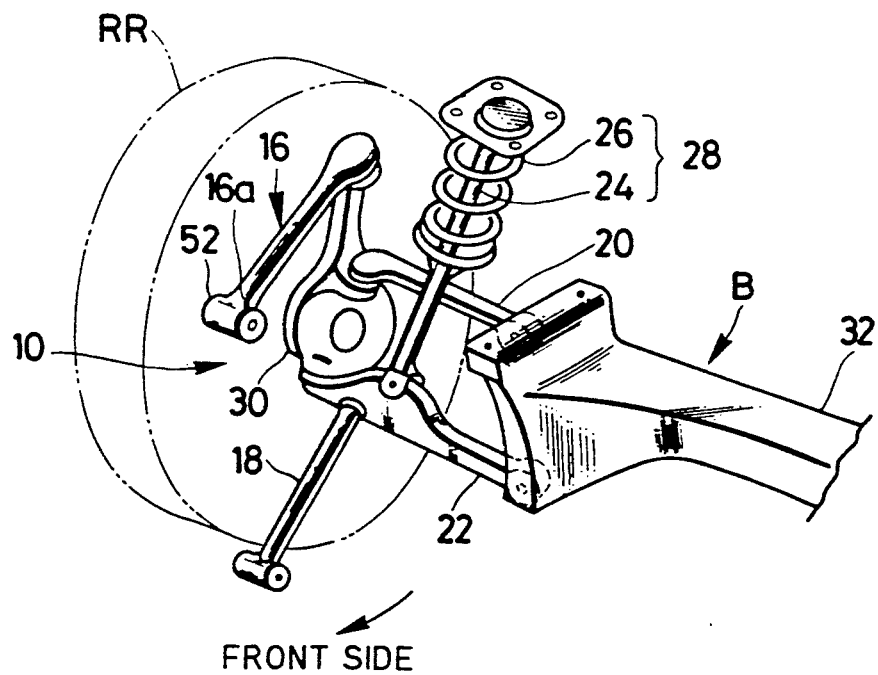

FIG. 1 is a partially cutaway perspective view showing an arrangement of a vehicle to which an embodiment of a rear suspension mounting structure according to the present invention to be described below is to be applied, and FIG. 2 is a perspective view showing an arrangement of a rear suspension to which the embodiment of the rear suspension mounting structure according to the present invention to be described below is applied.

As shown in FIG. 2, a rear suspension 10 is constituted as a multi-link type suspension, and is arranged on a rear wheel house portion 14 of a vehicle 12, more specifically, the rear wheel house portion 14 for a rear right wheel RR, as shown in FIG. 1.

The suspension 10 comprises a plurality of suspension links, as shown in FIG. 2. The suspension links include upper and lower longitudinal links 16 and 18, extending substantially in a longitudinal direction of a vehicle body, for mainly supporting a load in the longitudinal direction of the vehicle body (load input from the vehicle wheel), and upper and lower lateral links 20 and 22, extending substantially in a lateral direction of the vehicle body, for mainly supporting a load in the lateral direction of the vehicle body (load input from the vehicle wheel). The suspension 10 is also equipped with a strut 28 consisting of a shock absorber 24 and a spring 26 in addition to the plurality of suspension links 16, 18, 20, and 22.

One-end portions of the suspension links 16, 18, 20, and 22 are coupled to a vehicle wheel support member 30 for rotatably supporting the rear right wheel RR, and their other-end portions are rotatably coupled to a vehicle body B. More specifically, the outer ends of the upper and lower lateral links 20 and 22 are coupled to the vehicle wheel support member 30, and their inner ends are coupled to a suspension member 32 constituting a portion of the vehicle body B. The rear end of the upper longitudinal link 16 is coupled to the vehicle wheel support member 30, and its front end is coupled to the vehicle body B in the following manner. The rear end of the lower longitudinal link 18 is coupled to the vehicle wheel support member 30 via the lower lateral link 22, and its front end is coupled to the vehicle body B in an appropriate manner as above. Note that the lower end of the strut 28 is coupled to the vehicle wheel support member 30 via the lower lateral link 22 and its upper end is coupled to a suspension tower upper portion 34 (to be described later) constituting a portion of the vehicle body B.

The mounting structure of a vehicle body coupling end (front end) 16a of the upper longitudinal link 16 to the vehicle body is the characteristic feature of the present invention, and various embodiments of the mounting structure will be explained below.

FIRST EMBODIMENT

Figure 3:
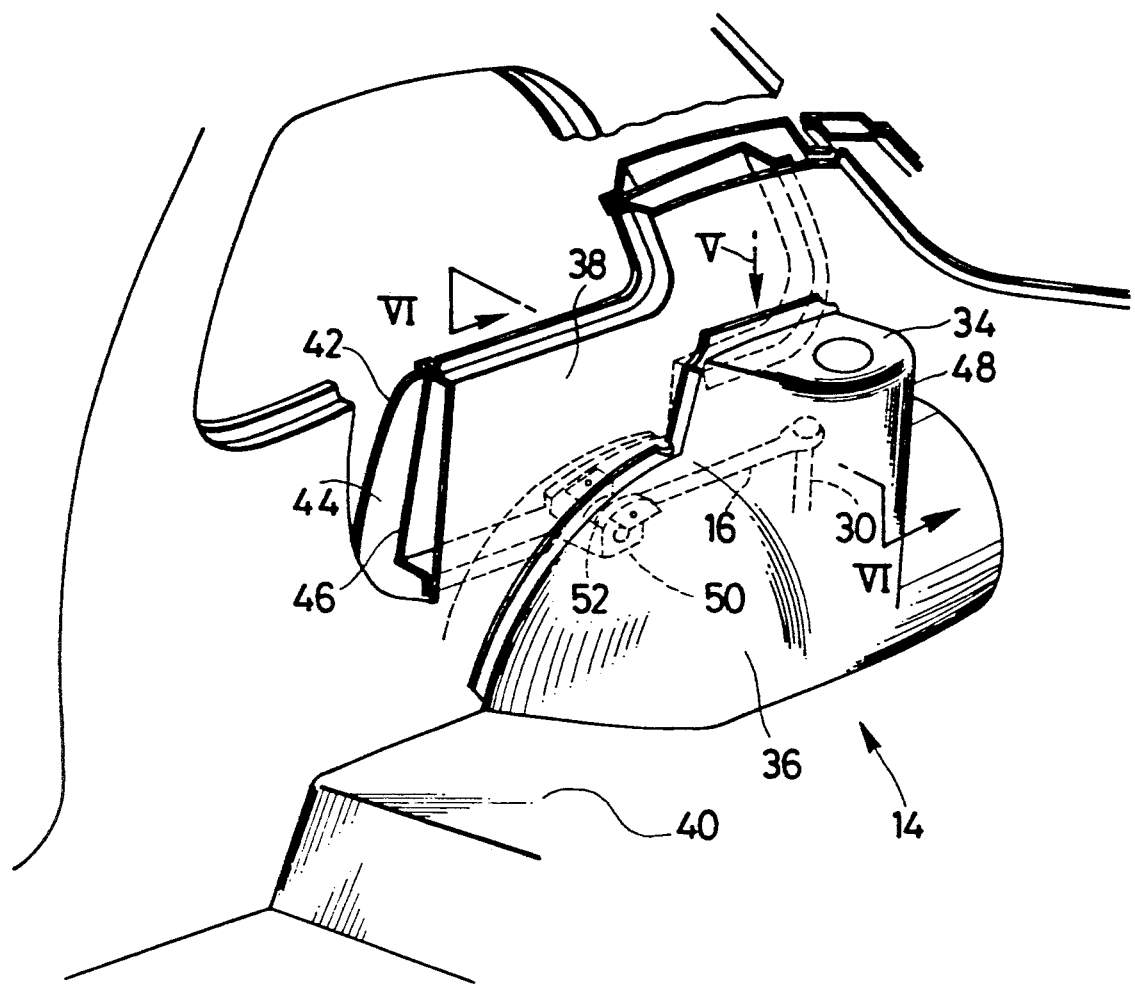
FIG. 3 is a perspective view showing an arrangement of a first embodiment of a rear suspension mounting structure according to the present invention.
Figure 4:
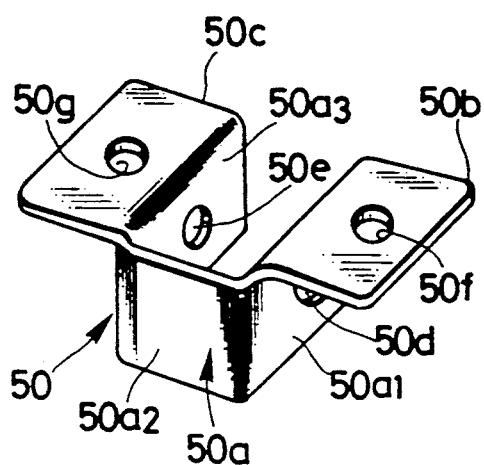
FIG. 4 is a perspective view of a link bracket structure shown in FIG. 3.
Figure 5:
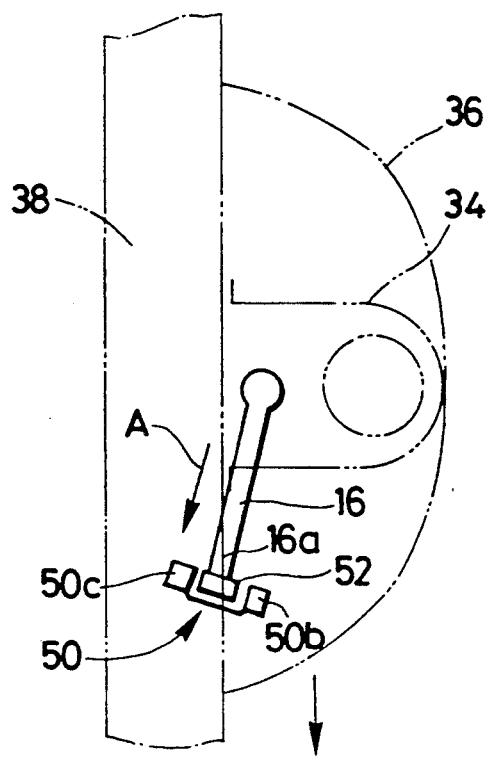
FIG. 5 is a plan view showing a link bracket mounting state when viewed from a direction of an arrow V in FIG. 3.
Figure 6:
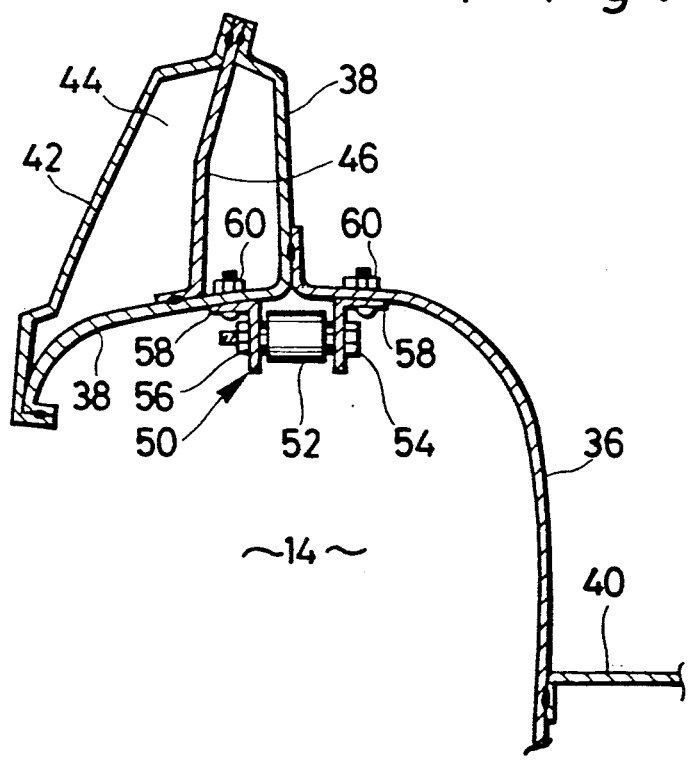
FIG. 6 is a sectional view of a link bracket mounting state taken along a line VI—VI in FIG. 3.

FIG. 3 is a perspective view showing the arrangement of the first embodiment of the rear suspension mounting structure, FIG. 4 is a perspective view showing the arrangement of a link bracket shown in FIG. 3, FIG. 5 is a plan view of the upper longitudinal link 16 when viewed from a direction of an arrow V in FIG. 3, and FIG. 6 is a sectional view of the upper longitudinal link mounting state taken along a line VI —VI in FIG. 3.

The structure of the rear wheel house portion 14 as a structure of the vehicle body B to which the rear suspension 10 for the rear right wheel RR is attached will be described below.

As shown in FIG. 3, the rear wheel house portion 14 is constituted by a rear wheel house panel comprising a rear wheel house inner portion 36, and a rear quarter panel 38 to which the outer side end of the rear wheel house inner portion 36 in the lateral direction of the vehicle body is joined, as shown in FIG. 6. The lower end of the rear wheel house inner portion 36 is joined to the outer side end of a rear floor 40 in the lateral direction of the vehicle body. The upper and lower ends of the rear quarter panel 38 are joined to a rear fender 42 located outside the panel 38 in the lateral direction of the vehicle body.

The rear quarter panel 38 and the rear fender 42 form a closed space 44 which is closed with respect to an external portion. A belt reinforcement 46 is disposed in the closed space 44 to improve a rigidity of the vehicle body B. As shown in FIG. 6, the upper end of the belt reinforcement 46 is clamped between the upper ends of the rear quarter panel 38 and the rear fender 42, and these three ends are integrated by welding, and its lower end is welded to a middle portion of the rear quarter panel 38.

A suspension tower lower portion 48 is integrally formed on the central upper portion of the rear wheel house inner portion 36. The above-mentioned suspension tower upper portion 34 is integrally mounted on the upper end of the suspension tower lower portion 48. The suspension tower upper and lower portions 34 and 48 constitute a suspension tower section.

As described above, the upper longitudinal link 16 extending substantially in the longitudinal direction of the vehicle body is disposed to extend laterally outwardly toward the forward direction of the vehicle body, as shown in FIG. 3, and to be inclined downward toward the forward direction of the vehicle body although not shown. The vehicle body coupling end 16a of the upper longitudinal link 16 is welded to a cylindrical sleeve 52 storing a rubber bushing 52a therein. The vehicle body coupling end 16a is pivotally supported on a link bracket 50 via a support bolt 54 which extends through the rubber bushing 52a. The support bolt 54 is fixed to the link bracket 50 by a nut 56. The link bracket 50 is fixed over the rear wheel house inner portion 36 and the rear quarter panel 38 via two mounting bolts 58 and nuts 60, as will be described in detail below.

As shown in FIG. 4, the link bracket 50 comprises a main body 50a constituted by three segments $50a_1$, $50a_2$, and $50a_3$, which are connected to define a U shape when viewed from the top, and flange portions 50b and 50c integrally extending outwardly from the upper edges of the opposing segments $50a_1$ and $50a_3$ of the main body 50a. Through holes 50d and 50e through which the support bolt 54 described above extends are formed in the two segments $50a_1$ and $50a_3$, respectively. Mounting holes 50f and 50g through which the mounting bolts 58 are inserted are formed in the flange portions 50b and 50c, respectively. One flange portion 50b located inward in the lateral direction of the vehicle body is fixed to the lower surface of the rear wheel house inner portion 36 via the set of the mounting bolt 58 and the nut 60. The other flange portion 50c located outward is fixed to the lower surface of the rear quarter panel 38 via the set of the mounting bolt 58 and the nut 60.

A sheet belt retractor (not shown) is attached to the rear quarter panel 38. Since the sheet belt retractor is attached, the thickness of the rear quarter panel 38 is relatively large to give a predetermined mechanical strength and a predetermined rigidity. The rear quarter panel 38, together with the rear fender 42 forms the closed space 44, as shown in FIG. 6. Furthermore, the belt reinforcement 46 is disposed in the closed space 44. In this manner, the rear quarter panel 38 can have a sufficiently high mechanical strength and rigidity.

In the first embodiment, one end of link bracket 50 is joined to the rear quarter panel 38 having the high mechanical strength and rigidity. Therefore, a support rigidity of the vehicle body coupling end 16a of the upper longitudinal link 16 by the link bracket is sufficiently high, and, hence, noise or a vibration caused by a load input from the rear right wheel RR through the upper longitudinal link 16 can be suppressed. Even if a large load in a direction of an arrow A in FIG. 5 acts on the upper longitudinal link 16 upon collision, the upper longitudinal link 16 can be prevented from projecting forward into the vehicle body as much as possible since the support rigidity by the link bracket 50 is high.

Furthermore, the link bracket 50 for supporting the vehicle body coupling end 16a of the upper longitudinal link 16 is joined to the rear quarter panel 38 located laterally outside the vehicle body with respect to the wheel house inner portion 36. As a result, the upper longitudinal link 16 is inclined laterally outwardly toward the forward direction of the vehicle body, as shown in FIG. 5. In this manner, even if the upper longitudinal link 16 projects forward upon reception of an excessive load upon collision, it projects outside a passenger's room. Therefore, the upper longitudinal link 16 can be prevented from projecting into the passenger's room, thus advantageously assuring a "crash space".

SECOND EMBODIMENT

Figure 7:
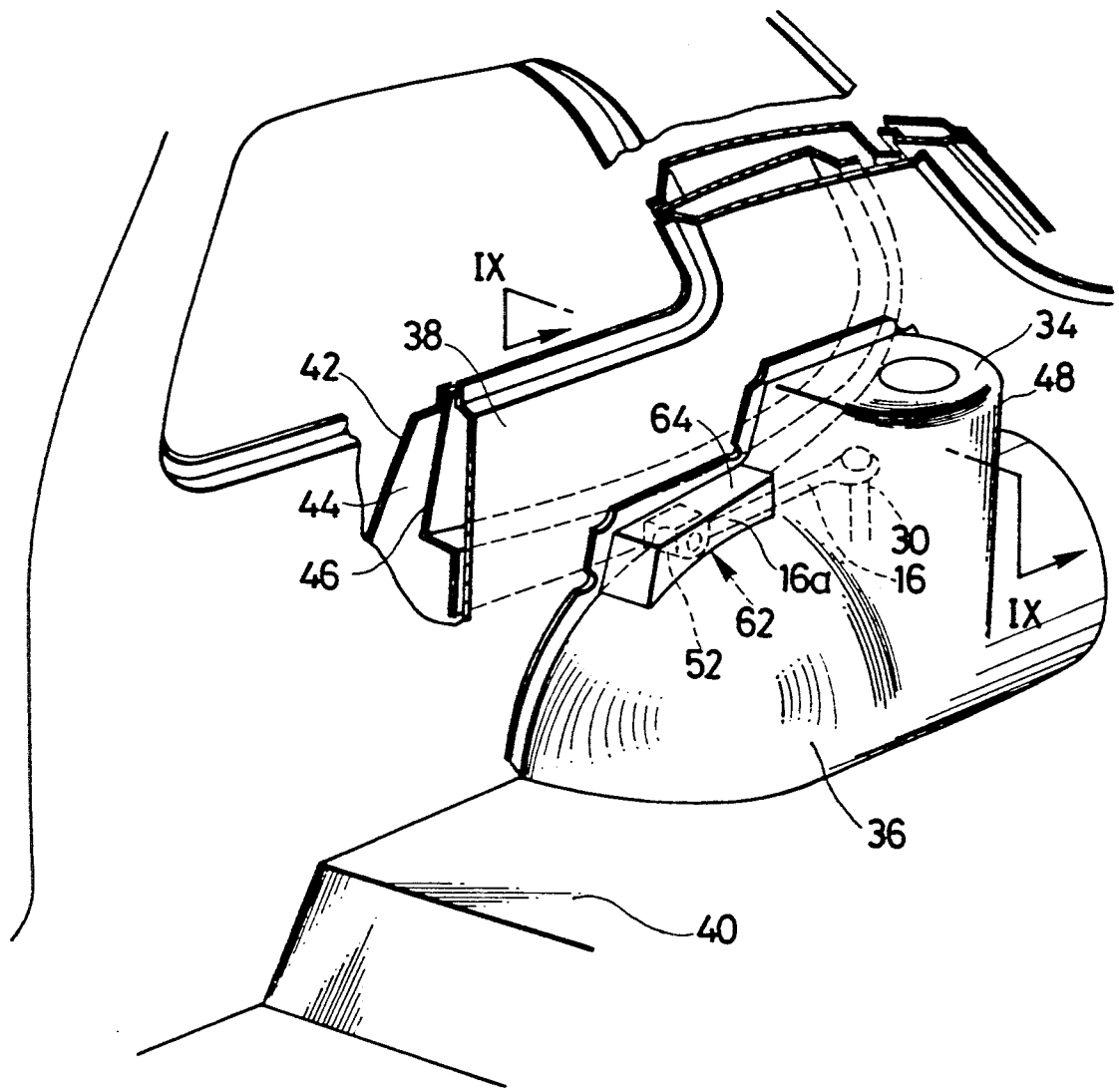
FIG. 7 is a perspective view showing a second embodiment of a rear suspension mounting structure according to the invention.
Figure 8:
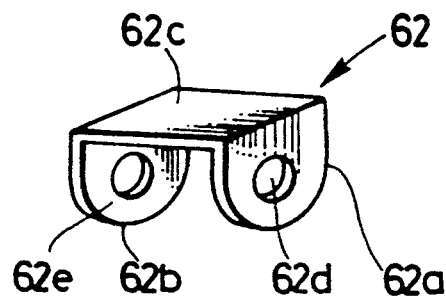
FIG. 8 is a perspective view of a link bracket shown in FIG. 7.
Figure 9:
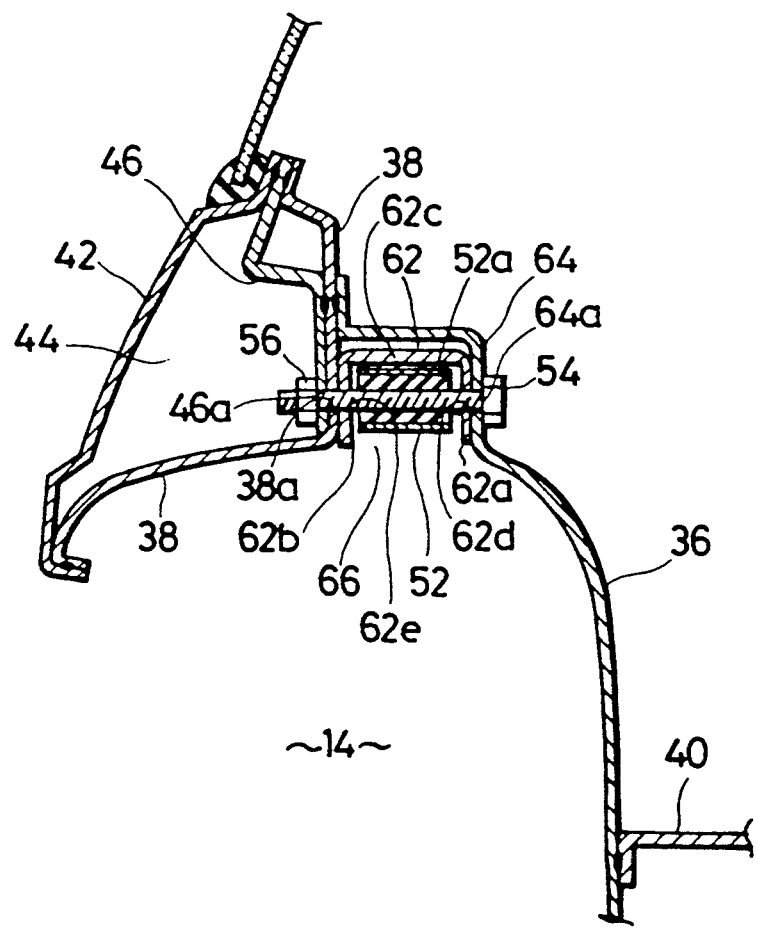
FIG. 9 is a sectional view of the mounting structure taken along a line IX—IX in FIG. 7.

FIG. 7 is a perspective view showing an arrangement of the second embodiment of a rear suspension mounting structure, FIG. 8 is a perspective view of an arrangement of a link bracket shown in FIG. 7, and FIG. 9 is a sectional view of a rear suspension mounting state taken along a line IX—IX in FIG. 7.

In the second embodiment, a rear wheel house portion 14 of a vehicle body, a structure near it, the extending direction of an upper longitudinal link 16, and the like are the same as those in the first embodiment. Thus, the same reference numerals denote the same parts and a detailed description thereof will be omitted. The same applies to the third to fifth embodiments to be described later.

In the second embodiment, a vehicle body coupling end 16a of the upper longitudinal link 16 is coupled and supported on a link bracket 62 having a structure different from that in the first embodiment via a rubber bushing by a mounting bolt 54 and a nut 56. The link bracket 62 is constituted by a pair of parallel support segments 62a and 62b spaced apart by a predetermined distance, and a coupling segment 62c for coupling the upper ends of the two support segments 62a and 62b so as to define a U shape when viewed from the front side. A pair of through holes 62d and 62e through which the mounting bolt 54 described above is inserted are formed in the support segments 62a and 62b.

A bulged portion 64 whose upper end portion is bulged upward in a box-like shape is formed on a portion of the rear wheel house inner portion 36, which portion is located immediately before a suspension tower section. The bulged portion 64 and a rear quarter panel 38 define a recess portion 66 with an open lower surface. A belt reinforcement 46 is bent at its middle portion toward the rear quarter panel 38 in a closed space 44. The lower portion of the belt reinforcement 46 is in contact with and welded to the rear quarter panel 38.

In the recess portion 66, the link bracket 62 is disposed from the below. Through holes 64a and 38a through which the mounting bolt 54 is inserted are formed in a portion of the left side wall of the bulged portion 64 which defines the left side surface of the recess portion 66, and a portion of the rear quarter panel 38 which defines the left side surface, where the link bracket 54 is disposed. Furthermore, as the characteristic feature of the second embodiment, the belt reinforcement 46 extends vertically downward to a position immediately aside the position of the link bracket 62. A through hole 46a is also formed in the belt reinforcement 46 to be matched with the through hole 38a formed in the rear quarter panel 38.

More specifically, the mounting bolt 54 extends through the through hole 64a formed in the bulged portion 64 of the rear wheel house inner portion 36, and the through hole 62d formed in the inner support segment 62a of the link bracket 62 in the widthwise direction of the vehicle body, then extends through the rubber bushing 52a, the through hole 62e formed in the outer support segment 62b of the link bracket 62 in the widthwise direction of the vehicle body, the through hole 38a formed in the rear quarter panel 38, and the through hole 46a formed in the belt reinforcement 46a in turn, and is commonly fastened by the nut 56.

In the second embodiment, the link bracket 62 to which the vehicle body coupling end 16a of the upper longitudinal link 16 is coupled is joined to the rear quarter panel 38. As a result, the same effect as in the first embodiment can be obtained. In addition, in the second embodiment, since the belt reinforcement 46 is joined to a portion where the link bracket 62 is joined, the support rigidity by the link bracket 62 can be further improved.

THIRD EMBODIMENT

Figure 10:
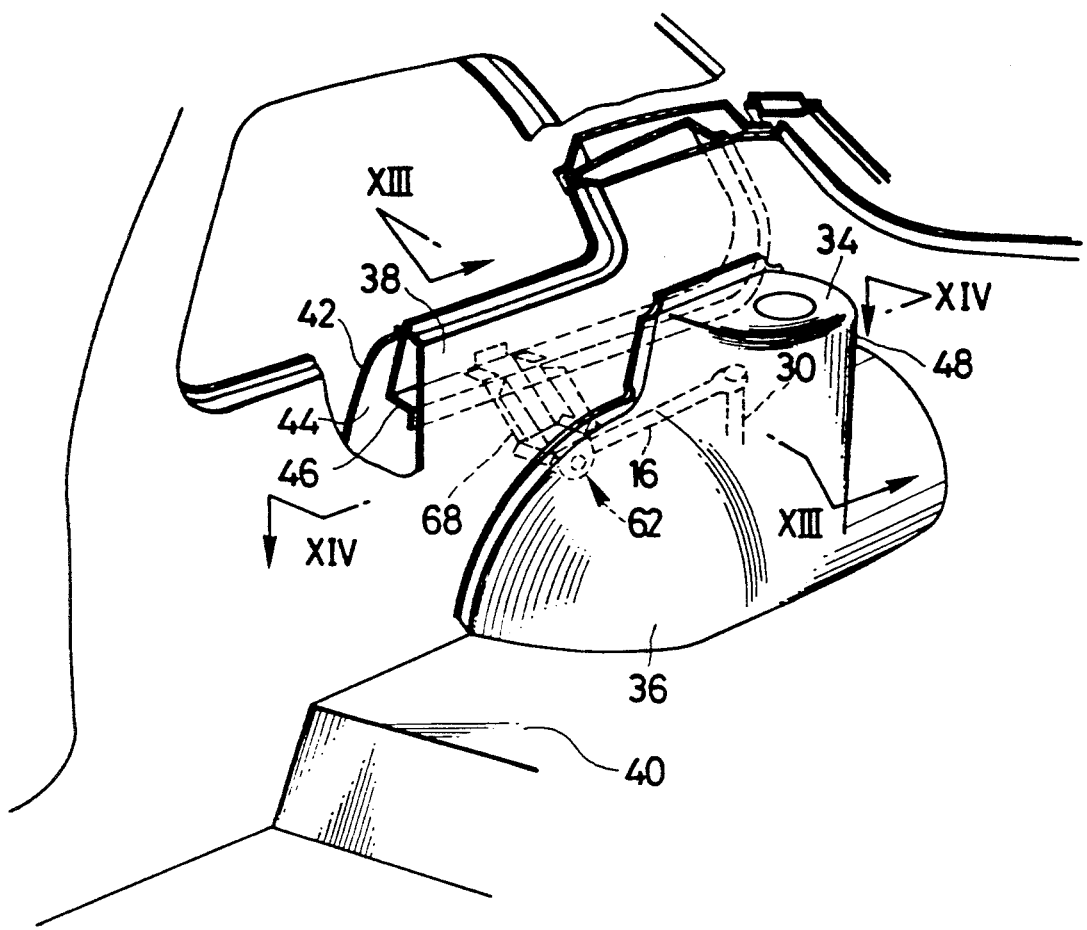
FIG. 10 is a perspective view showing a third embodiment of a rear suspension mounting structure according to the invention.
Figure 11:
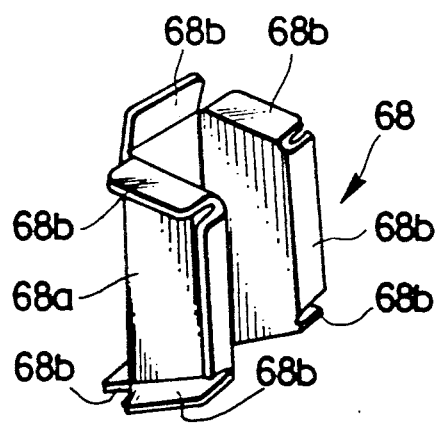
FIG. 11 is a perspective view of a link reinforcement shown in FIG. 10.
Figure 12:
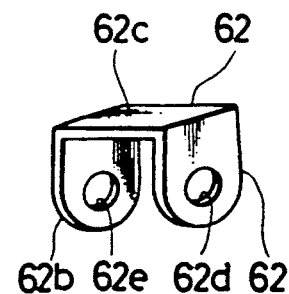
FIG. 12 is a perspective view of a link bracket shown in FIG. 10.
Figure 13:
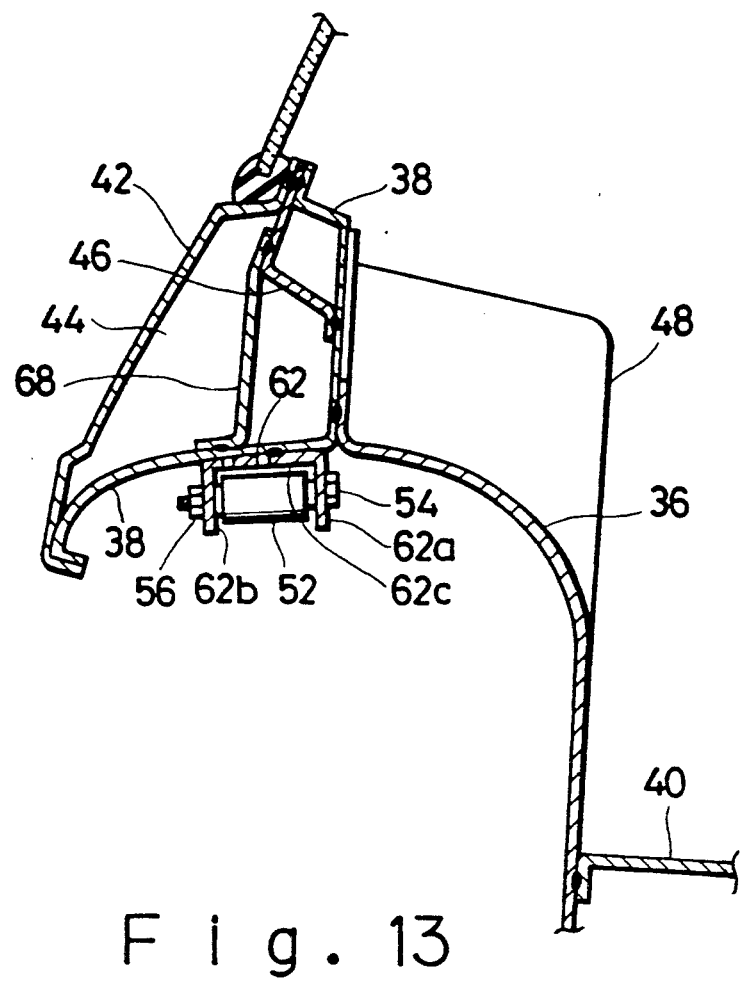
FIGS. 13 and 14 are sectional views of the mounting structure taken along lines XIII—XIII and XIV—XIV in FIG. 10, respectively.
Figure 14:
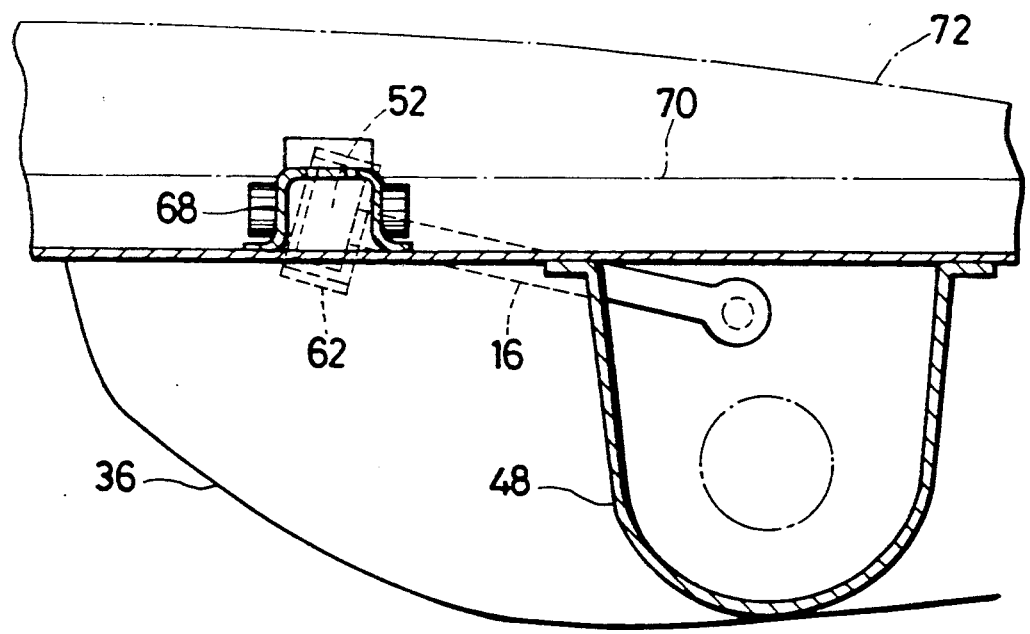

FIG. 10 is a perspective view showing an arrangement of the third embodiment of a rear suspension mounting structure, FIG. 11 is a perspective view showing a link reinforcement structure shown in FIG. 10, FIG. 12 is a perspective view showing an arrangement of a link bracket shown in FIG. 10, and FIGS. 13 and 14 are sectional views of the rear suspension mounting state taken along lines XIII—XIII and XIV—XIV in FIG. 10, respectively.

In the third embodiment, a vehicle body coupling end 16a of an upper longitudinal link 16 is supported by a link bracket 62 which is the same as that in the second embodiment via a rubber bushing 52a by a mounting bolt 54 and a nut 56. A belt reinforcement 46 is disposed in a closed space 44, as in the second embodiment. Furthermore, as the characteristic feature of the third embodiment, a link reinforcement 68 is disposed in the closed space 44. The link reinforcement 68 comprises a U-shaped main body 68a when viewed from the top, as shown in FIG. 11. Joint tongue portions 68b integrally extend from the respective edges of the main body 68a.

As shown in FIGS. 10 and 13, the link reinforcement 68 extends substantially in the vertical direction in the closed space, and is joined to the bent portion and the lower surface of the belt reinforcement 46 and the outer side surface and the upper surface of a rear quarter panel 38 via the corresponding tongue portions 68b. As shown in FIGS. 13 and 14, a coupling segment 62c of the link bracket 62 is welded to a portion of the rear quarter panel 38, where the lower end portion of the link reinforcement 68 is joined. In FIG. 14, positions indicated by alternate long and short dashed lines indicate positions of the lower edge of the belt reinforcement 46, and the lower edge of a rear fender (not shown).

In the third embodiment, since the link bracket 62 is joined (welded) to the rear quarter panel 38, the same effect as in the first embodiment can be obtained. In the third embodiment, since the link reinforcement 68 is joined (welded) to a portion of the rear quarter panel 38 where the link bracket 62 is joined, the link bracket 62 can provide a higher support rigidity.

FOURTH EMBODIMENT

Figure 15:
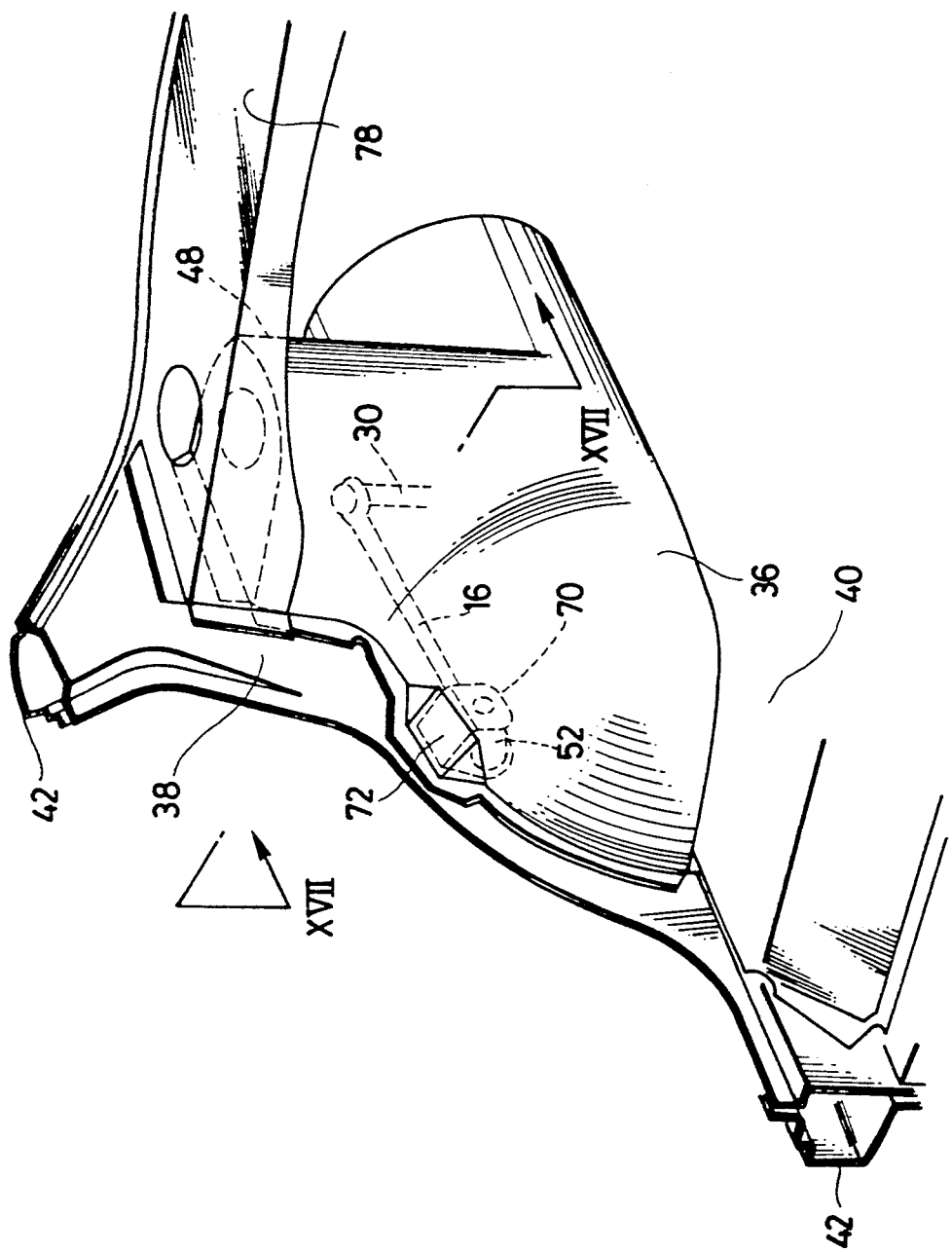
FIG. 15 is a perspective view showing a fourth embodiment of a rear suspension mounting structure according to the invention.
Figure 16:
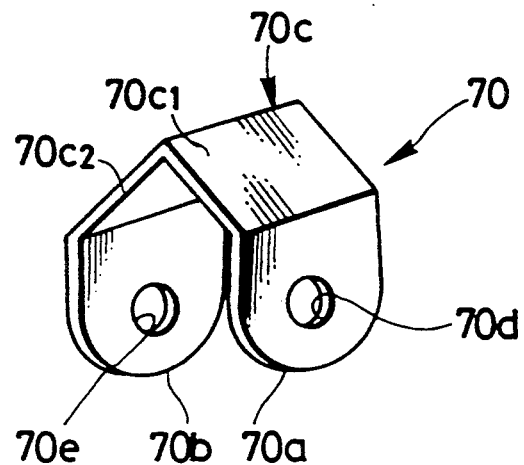
FIG. 16 is a perspective view of a link bracket shown in FIG. 15.
Figure 17:
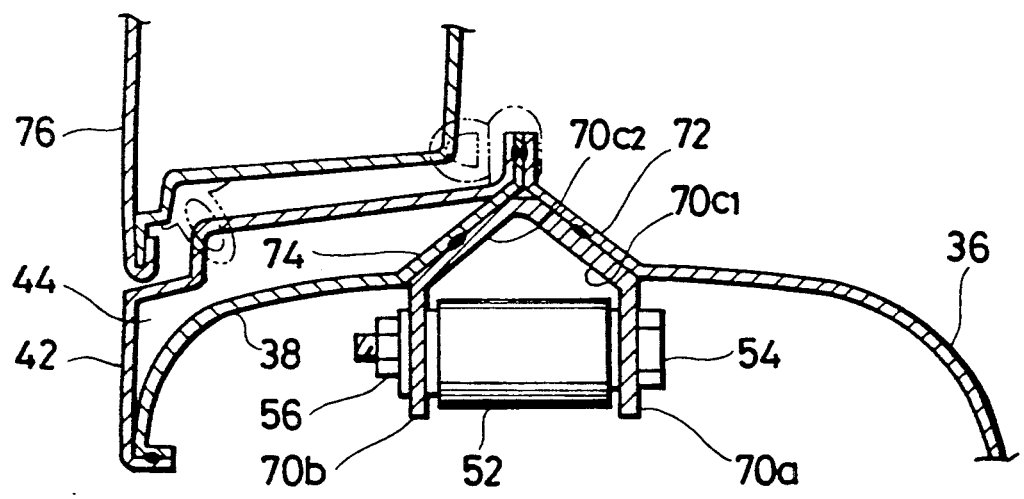
FIG. 17 is a sectional view of the mounting structure taken along a line XVII—XVII in FIG. 15.

FIG. 15 is a perspective view showing an arrangement of the fourth embodiment of a rear suspension mounting structure, FIG. 16 is a perspective view of a link bracket structure shown in FIG. 15, and FIG. 17 is a sectional view of a rear suspension mounting state taken along a line XVII—XVII in FIG. 15.

In the fourth embodiment, the present invention is applied to a four-door vehicle. In the fourth embodiment, a vehicle body coupling end 16a of the upper longitudinal link 16 is supported on a link bracket 70 having a structure different from that in the second and third embodiments via a rubber bushing 52a by a mounting bolt 54 and a nut 56. As shown in FIG. 16, the link bracket 70 is constituted by a pair of parallel support segments 70a and 70b spaced apart by a predetermined distance, and a coupling segment 70c, bent in an inverted-V shape, for coupling the upper ends of the support segments 70a and 70b to define a house-like shape when viewed from the front side. More specifically, the coupling segment 70c is constituted by a pair of segments $70c_1$ and $70c_2$ which cross to define an obtuse angle.

A pair of through holes 70d and 70e through which the mounting bolt 54 is inserted are formed in these support segments 70a and 70b. A first inclined portion 72 which is inclined upward toward a rear quarter panel 38 is formed on a portion of a rear wheel house inner portion 36, which portion is located immediately in front of a suspension tower upper portion 34. The first inclined portion 72 opposes the inner segment $70c_1$ of the coupling segment 70c in the widthwise direction of the vehicle body described above. A second inclined portion 74 which is inclined upward toward the rear wheel house inner portion 36 is formed on the rear quarter panel 38. The second inclined portion 74 opposes the outer segment $70c_2$ of the coupling segment 70c in the widthwise direction of the vehicle body.

The pair of segments $70c_1$ and $70c_2$ of the inverted-V shaped coupling segment $70_c$ of the link bracket 70 are welded to the first and second inclined portions 72 and 74. In this embodiment, no belt reinforcement is disposed in a closed space 44 formed by the rear quarter panel 38 and a rear fender 42. Reference numeral 76 denotes a rear door; and 78, a package tray.

In the fourth embodiment, since the link bracket 70 is joined to the rear quarter panel 38, the same effect as in the first embodiment can be obtained.

FIFTH EMBODIMENT

Figure 18:
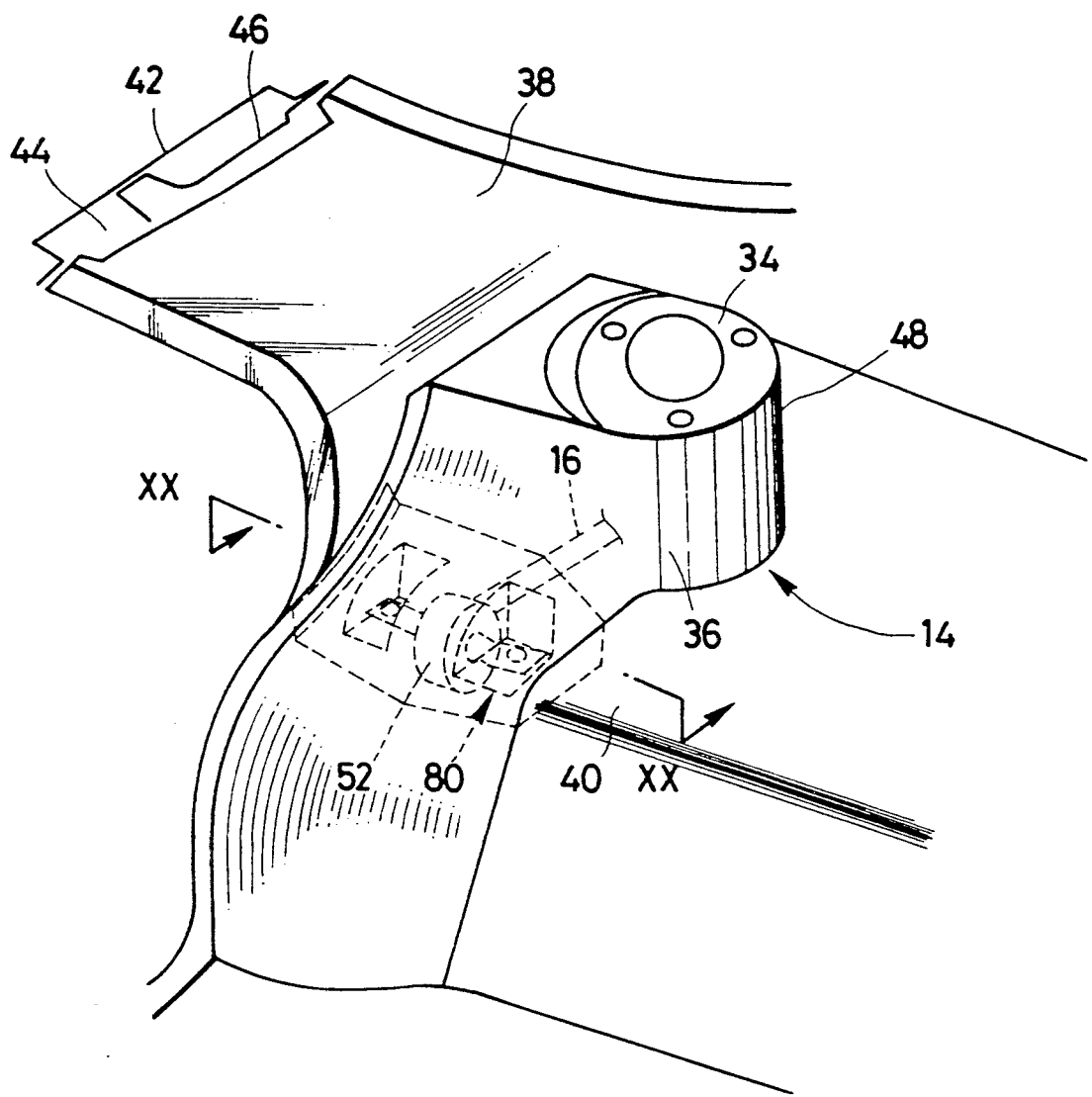
FIG. 18 is a perspective view showing the fifth embodiment of a vehicle rear suspension mounting structure according to the invention.
Figure 19:
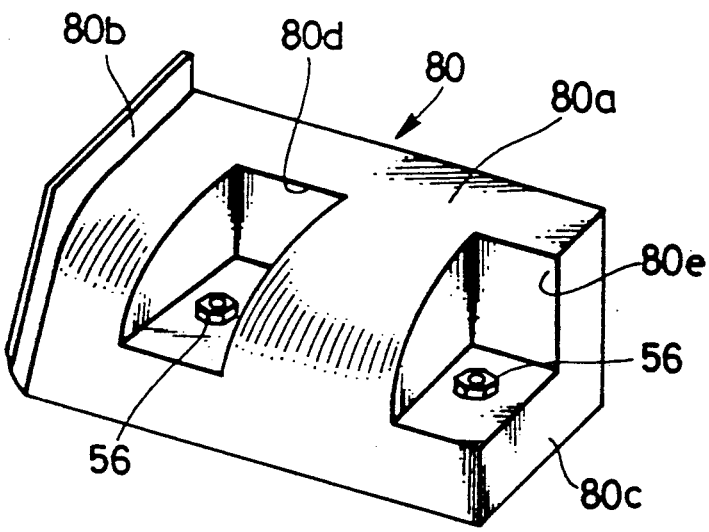
FIG. 19 is a perspective view of a link bracket shown in FIG. 18.
Figure 20:
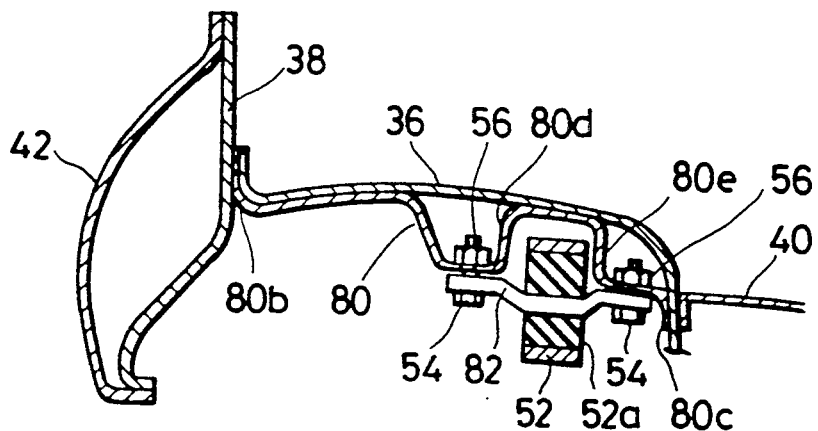
FIG. 20 is a sectional view of the mounting structure taken along a line XX—XX in FIG. 18.
Figure 21:
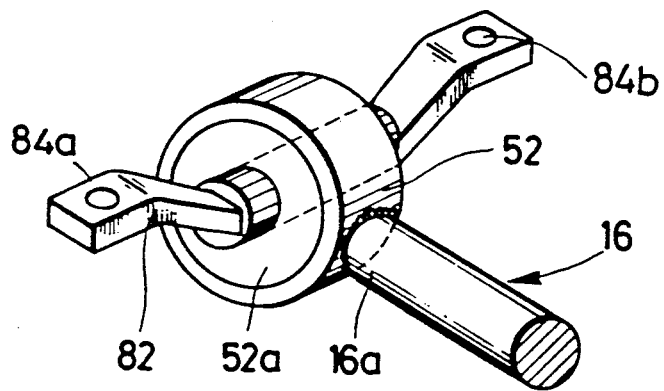
FIG. 21 is a perspective view showing a shape of a vehicle body mounting end of an upper longitudinal link.

FIG. 18 is a perspective view showing an arrangement of the fifth embodiment of a vehicle rear suspension mounting structure, FIG. 19 is a perspective view of a link bracket shown in FIG. 18, FIG. 20 is a sectional view of a rear suspension mounting state taken along a line XX—XX in FIG. 18, and FIG. 21 is a perspective view showing a shape of a vehicle body coupling end of an upper longitudinal link.

The structure of a rear wheel house portion 14 and its vicinity of the vehicle body in the fifth embodiment is the same as that in the first embodiment. In the fifth embodiment, a vehicle body coupling end 16a of an upper longitudinal link 16 is coupled to the vehicle body via a link bracket 80.

As shown in FIG. 19, the link bracket 80 is constituted by a plate member, and is formed into a box member with three open surfaces, i.e., open lower, rear, and right side surfaces. An upper surface 80a of the link bracket 80 is curved along the curved lower surface of a rear wheel house inner portion 36. A mounting segment 80b stands upright at the right side edge (side edge located on the left side in FIG. 19) of the link bracket 80, and a left side wall 80c is integrally formed at the left side edge (side edge located on the right side in FIG. 19).

Two recess portions 80d and 80e are formed in the upper surface 80a of the link bracket 80 to be juxtaposed in the lateral direction. The bottom surfaces of the recess portions 80d and 80e are set to have the same level, and are sunk to a level immediately above the lower edge of the box member. Mounting holes (not shown) through which the mounting bolts 54 are inserted to extend them vertically are formed in substantially the central portions of the bottom surfaces of the two recess portions 80d and 80e, and the nuts 56 to be threadably engaged with the corresponding bolts 54 are welded on the bottom surfaces to be matched with these mounting holes.

A cylindrical sleeve 52 having the central axis extending along the lateral direction is integrally fixed to the vehicle body coupling end 16a of the upper longitudinal link 16 as a suspension link as in the first embodiment described above. The rubber bushing 52a is housed in the sleeve 52. A mounting stay 82 is arranged to extend through substantially the central portion of the rubber bushing 52a in the lateral direction. The two ends of the mounting stay 82 extend outwardly from the two sides of the rubber bushing 52a.

Through holes 84a and 84b through which the bolts 54 are inserted to extend vertically are formed in the two ends of the mounting stay 82. These through holes 84a and 84b are matched with the pair of mounting holes of the link bracket 80 in a state wherein the rear suspension 10 is mounted in the rear wheel house portion 14. As can be seen from FIG. 21, the two ends of the mounting stay 82 are bent to be located at a higher level than that of its central portion attached to the rubber bushing 52a.

The upper surface 80a of the link bracket 80 with the above structure is in contact with and welded to the curved lower surface of the rear wheel house inner portion 36. As is apparent from FIG. 20, the mounting segment 80b at the right side edge of the link bracket 80 is welded to the right side edge portion, i.e., the outer edge portion of the rear wheel house inner portion 36 and the rear quarter panel 38 to be clamped therebetween. The left side wall 80c of the link bracket 80 is welded on the left side edge portion, i.e., an inner edge portion of the rear wheel house inner portion 36 to overlap a joint portion with a rear floor 40.

The link bracket 80 welded to the vehicle body and the vehicle body coupling end 16a of the rear longitudinal link 16 are coupled to each other by inserting the bolts 54 in the mounting holes 84a and 84b formed in the two ends of the mounting stay 82 from below and in the mounting holes formed in the two recess portions 80d and 80e of the link bracket 80, and then threadably engaging them with the corresponding nuts 56.

Since one end of the link bracket 80 to which the vehicle body coupling end 16a of the rear longitudinal link 16 is coupled is welded to the rear quarter panel 38, the same effect as in the first embodiment can be obtained. The other end of the link bracket 80 is welded to the joint portion of the left side edge portion of the rear wheel house inner portion 36 and the rear floor 40. In this manner, a high support rigidity can be obtained by the link bracket 80.

The present invention is not limited to the arrangements of the embodiments described above, and various changes and modifications may be made within the spirit and scope of the invention. For example, the present invention may be applied to various other vehicles in addition to the above-mentioned vehicles. In addition, the present invention may be applied to various other suspensions in addition to that shown in FIG. 2 as long as they have a suspension link located near a wheel house inner portion.

As described above, in a vehicle rear suspension mounting structure according to the present invention, since a vehicle body coupling end of a suspension link extending in the longitudinal direction of a vehicle body is supported by a link bracket joined to a rear quarter panel, the suspension link can be coupled to a portion near the rear quarter panel (rear wheel house panel) with a sufficiently high support rigidity. In addition, since this link is disposed to be inclined laterally outwardly toward the forward direction of the vehicle body, noise and vibration and forward projection of the link upon collision can be prevented. Furthermore, even when the link accidentally projects forward, it can be prevented from projecting into a passenger's room.

As many apparently widely different embodiments of the present invention can be made without departing from the spirit and scope thereof, it is to be understood that the invention is not limited to the specific embodiments thereof except as defined in the appended claims.

What is claimed is:

1. A vehicle rear suspension mounting structure for mounting a suspension link of a rear suspension to a vehicle body, the suspension link having first and second ends, with the first end coupled to a wheel support member for rotatably supporting a vehicle wheel and the suspension link extending substantially in a longitudinally direction of said vehicle body, the mounting structure comprising:
   a vehicle body coupling end formed on the second end of said suspension link;
   a link bracket for supporting said vehicle body coupling end;
   a rear wheel house portion including a rear quarter panel and a rear wheel house inner portion joined to the rear quarter panel at an inner end thereof in a widthwise direction of said vehicle body, wherein the rear quarter panel and a rear fender of the vehicle body form a closed space; and
   joint means for joining said link bracket to said rear quarter panel which forms a direct rigid support means for the suspension link from the vehicle body.

2. The rear suspension mounting structure according to claim 1, further comprising a rubber bushing for rotatably supporting said vehicle body coupling end on said link bracket.

3. The rear suspension mounting structure according to claim 2, further comprising a sleeve, fixed to said vehicle body coupling end, for storing said rubber bushing.

4. The rear suspension mounting structure according to claim 1, wherein said link bracket is welded to a lower surface of said rear quarter panel.

5. The rear suspension mounting structure according to claim 4, wherein the rear fender is joined to an outer portion of said rear quarter panel for forming the closed space between the rear fender and said rear quarter panel; and
   wherein the structure further comprises
   a belt reinforcement for reinforcing the closed space, the belt reinforcement having a lower end fixed to said rear quarter panel; and
   a link reinforcement means for coupling said belt reinforcement and an upper surface of a portion of said rear quarter panel where said link bracket is joined, and for mechanically reinforcing said rear quarter panel of said portion where said link bracket is joined.

6. The rear suspension mounting structure according to claim 1, wherein the link bracket is attached to both the rear quarter panel and the rear wheel house inner portion.

7. A vehicle rear suspension mounting structure for mounting a suspension link of a rear suspension to a vehicle body, the suspension link having first and second ends, with the first end coupled to a wheel support member for rotatably supporting a vehicle wheel and the suspension link extending substantially in a longitudinal direction of said vehicle body, the mounting structure comprising:
   a vehicle body coupling end formed on the second end of said suspension link;
   a link bracket for supporting said vehicle body coupling end;
   a rear wheel house portion including a rear quarter panel and a rear wheel house inner portion joined to the rear quarter panel at an inner end thereof in a widthwise direction of said vehicle body, wherein the rear quarter panel and a rear fender of the vehicle body form a closed space; and
   joint means for joining said link bracket to said rear quarter panel which forms a direct rigid support means for the suspension link from the vehicle body, wherein said link bracket includes a main body having an upper surface joined to a lower surface of said rear wheel house inner portion, and an upright segment integrally formed on one side of said main body, and fixedly positioned and connected between joint portions of said rear wheel house inner portion and said rear quarter panel.

8. A vehicle rear suspension mounting structure for mounting a suspension link of a rear suspension to a vehicle body, the suspension link having first and second ends, with the first end coupled to a wheel support member for rotatably supporting a vehicle wheel and the suspension link extending substantially in a longitudinal direction of said vehicle body, the mounting structure comprising:
   a vehicle body coupling end formed on the second end of said suspension link;
   a rear wheel house portion including a rear quarter panel and a rear wheel house inner portion joined to the rear quarter panel at an inner end thereof in a widthwise direction of said vehicle body;
   a link bracket for supporting said vehicle body coupling end, wherein said link bracket has first and second ends, the first end being joined to said rear quarter panel and the second end being joined to said rear wheel house inner portion; and
   joint means for joining said link bracket to said rear quarter panel which forms a direct rigid support means for the suspension link from the vehicle body.

9. The rear suspension mounting structure according to claim 8 further comprising a bolt and a nut for joining said link bracket to said rear quarter panel and said rear wheel house inner portion.

10. A vehicle rear suspension mounting structure mounting a suspension link of a rear suspension to a vehicle body, wherein the suspension link extends from a rear portion of the vehicle body toward a front portion thereof, and is inclined outwardly in a lateral direction of the vehicle body toward the front portion and wherein, the suspension link has first and second ends, with the first end coupled to a wheel support member for rotatably supporting a vehicle wheel and the suspension link extending substantially in a longitudinal direction of said vehicle body, the mounting structure comprising:
 a vehicle body coupling end formed on the second end of said suspension link;
 a link bracket for supporting said vehicle body coupling end; and
 joint means for joining said link bracket to a rear quarter panel constituting a rear wheel house portion of the vehicle body which forms a direct support means for the suspension link from the vehicle body.

11. A vehicle rear suspension mounting structure for mounting a suspension link of a rear suspension to a vehicle body, the suspension link having first and second ends, with the first end coupled to a wheel support member for rotatably supporting a vehicle wheel and the suspension link extending substantially in a longitudinal direction of said vehicle body, the mounting structure comprising:
 a vehicle body coupling end formed on the second end of said suspension link;
 a rear wheel house portion including a rear quarter panel and a rear wheel house inner portion joined to the rear quarter panel at an inner end thereof in a widthwise direction of said vehicle body, wherein the rear wheel house inner portion includes a bulged portion which is bulged upward in a rectangular shape on a joint portion of said rear quarter panel, and a lower surface of which defines a recess portion with an open lower surface;
 a link bracket for supporting said vehicle body coupling end, wherein said link bracket is fitted in the recess portion from the open lower surface, and is joined to be commonly fastened together with said rear wheel house inner portion and said rear quarter panel by means of a bolt; and
 joint means for joining said link bracket to said rear quarter panel which forms a direct support rigidity means for the suspension link from the vehicle body.

12. The rear suspension mounting structure according to claim 11, which further comprises:
 a rear fender, joined to an outer portion of rear quarter panel, for forming a closed space between the rear fender and said rear quarter panel; and
 a belt reinforcement for reinforcing the closed space, and
 wherein
 a lower end of said belt reinforcement extends to a portion of said rear quarter panel where said link bracket is joined, and is fixed to said portion of said rear quarter panel.

13. The rear suspension mounting structure according to claim 12, wherein the lower end of said belt reinforcement is commonly fastened to said link bracket by means of said bolt.

14. A vehicle rear suspension mounting structure for mounting a suspension link of a rear suspension to a vehicle body, the suspension link having first and second ends, with the first end coupled to a wheel support member for rotatably supporting a vehicle wheel and the suspension link extending substantially in a longitudinal direction of said vehicle body, the mounting structure comprising:
 a vehicle body coupling end formed on the second end of said suspension link;
 a rear wheel house portion including a rear quarter panel and a rear wheel house inner portion joined to the rear quarter panel at an inner end thereof in a widthwise direction of said vehicle body;
 a link bracket for supporting said vehicle body coupling end, wherein said link bracket is joined to and extends along lower surfaces of both said rear quarter panel and said rear wheel house inner portion; and
 joint means for joining said link bracket to said rear quarter which forms a direct support rigidity means for the suspension link from the vehicle body.

15. The rear suspension mounting structure according to claim 14, wherein
 a portion of said link bracket to be joined to said rear quarter panel and said rear wheel house inner portion is formed into an inverted-V shape having a pair of inclined surfaces which cross each other,
 a portion of said rear wheel house inner portion where said link bracket is to be joined includes a first inclined surface opposing one inclined surface of the inverted-V shaped link bracket portion, and
 a portion of said rear quarter panel where said link bracket is to be joined includes a second inclined surface opposing the other inclined surface of the inverted-V shaped link bracket portion.

16. The rear suspension mounting structure according to claim 14, wherein said link bracket is joined to said rear quarter panel and said rear wheel house inner portion by means of welding.

17. The rear suspension mounting structure according to claim 15, wherein said link bracket is joined to said rear quarter panel and said rear wheel house inner portion by means of welding.

18. A vehicle rear suspension mounting structure for mounting a suspension link of a rear suspension to a vehicle body, the suspension link having first and second ends, with the first end coupled to a wheel support member for rotatably supporting a vehicle wheel and the suspension link extending substantially in a longitudinal direction of said vehicle body, the mounting structure comprising:
 a vehicle body coupling end formed on the second end of said suspension link;
 a rear wheel house portion including a rear quarter panel and a rear wheel house inner portion joined to the rear quarter panel at an inner end thereof in a widthwise direction of said vehicle body;
 a link bracket for supporting said vehicle body coupling end, wherein said link bracket includes a main body having an upper surface joined to a lower surface of said rear wheel house inner portion, and an upright segment integrally formed on one side of said main body and fixedly positioned and connected between joint portions of said rear wheel house inner portion and said rear quarter panel; and joint means for joining said link bracket to the rear quarter panel which forms a direct support rigidity means for the suspension link from the vehicle body.

19. The rear suspension mounting structure according to claim 18, which further comprises:
   a mounting stay which is attached to said vehicle body coupling end and two ends of which project outwardly, and wherein
   said link has, on an upper surface thereof, a pair of recess portions which are juxtaposed in a widthwise direction of said vehicle body, and
   said vehicle body coupling end is supported on the lower surfaces of said pair of recess portions of said link bracket by means of said mounting stay.

20. The rear suspension mounting structure according to claim 19, wherein
   two ends of said mounting stay are supported on the lower surfaces of said pair of recess portions of said link bracket by means of bolts and nuts,
   said nuts are welded to bottom surfaces of the corresponding recess portions, and
   said bolts are threadably engaged with the corresponding nuts by means of through holes formed on the bottom surfaces of the corresponding recess portions.

21. The rear suspension mounting structure according to claim 18, wherein the upper surface of the main body is joined to the lower surface of said rear wheel house inner portion by means of welding, and wherein the joint portions of said rear wheel house inner portion and said rear quarter panel are joined by means of welding.

* * * * *

UNITED STATES PATENT AND TRADEMARK OFFICE
CERTIFICATE OF CORRECTION

PATENT NO.   : 5,127,666
DATED        : July 7, 1992
INVENTOR(S)  : MITSURU FUJINAKA, et al.

It is certified that error appears in the above-identified patent and that said Letters Patent is hereby corrected as shown below:

Col. 1,   line 12,   "these" s/b --there--;

line 18,   replace "vehicle such" with --vehicle wheel. Such--.

Signed and Sealed this

Fourth Day of January, 1994

Attest:

BRUCE LEHMAN

*Attesting Officer*        *Commissioner of Patents and Trademarks*